April 20, 1937.  L. A. FRAYER  2,077,519
METHOD OF MAKING METAL ARTICLES
Filed Nov. 22, 1933    2 Sheets-Sheet 1
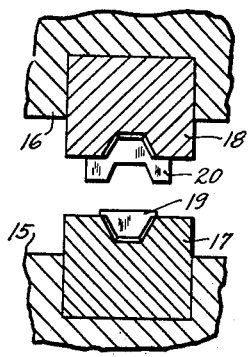
Fig.3
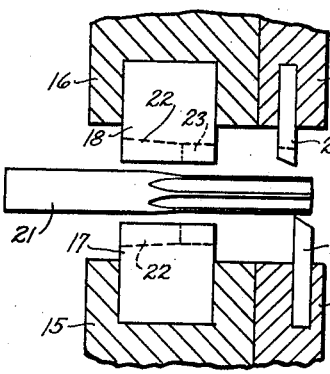
Fig.1
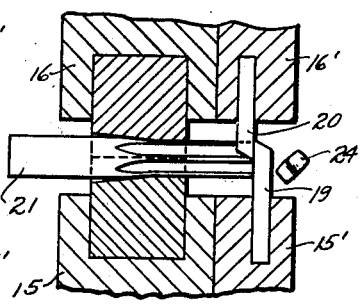
Fig.2
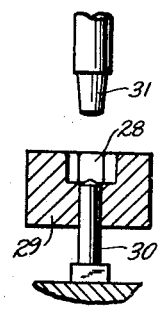
Fig.4
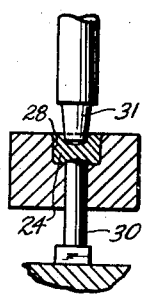
Fig.5
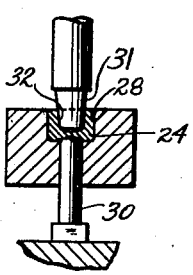
Fig.6
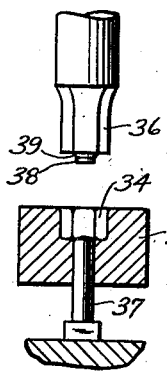
Fig.7
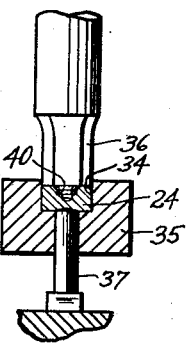
Fig.8
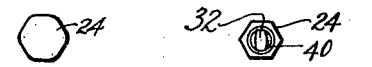
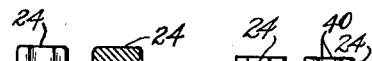
Fig.9  Fig.10
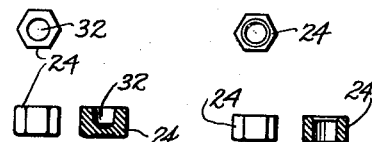
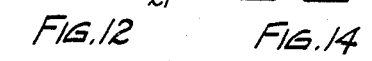
Fig.11  Fig.13
Fig.12  Fig.14
INVENTOR
LEE A. FRAYER
Kwis, Hudson & Kent
ATTORNEYS April 20, 1937. L. A. FRAYER 2,077,519
METHOD OF MAKING METAL ARTICLES
Filed Nov. 22, 1933 2 Sheets-Sheet 2

INVENTOR
LEE A. FRAYER
Kwis, Hudson & Kent.
ATTORNEYS

Patented Apr. 20, 1937

2,077,519

UNITED STATES PATENT OFFICE 2,077,519

METHOD OF MAKING METAL ARTICLES

Lee A. Frayer, Kent, Ohio, assignor to The Lamson & Sessions Company, Cleveland, Ohio, a corporation of Ohio Application November 22, 1933, Serial No. 699,117

19 Claims. (Cl. 10—86)

This invention relates a a novel method of making metal articles and while the method is especially adapted to the economical production of nut blanks, cap screws, and the like, it may also be applied to the making of various other metal articles.

Various methods have heretofore been proposed and used for the production of nut blanks and other metal articles, by the cold working of a metal body and, in certain of these methods, the metal has been subjected to pressure in a matrix or die to impart to the body of metal, by one or more operations thereon, the shape or form desired in the finished article. This pressure shaping of the metal, as heretofore carried out, has, in general, involved the use of very high working pressures which has resulted in objectionable wear and considerable breakage of the tool equipment being used in carrying out the method and in undesirable and costly interruptions to the continuous production of the desired articles.

With the novel method which I have devised, nut blanks and other metal articles can be economically produced with minimum tool wear and breakage and it is characteristic of this improved method that the working pressures involved are considerably less than those generally required in the methods above mentioned.

It is therefore an object of the present invention to provide a novel method of economically producing metal articles such as nut blanks, cap screws, and other articles, which involves the novel steps of forming an opening or recess in a body of metal by displacing metal from one portion of the body to another, and then shaping the body by applying pressure thereto in a die and allowing some of the metal of the body to flow into said opening or recess.

Another object of this invention is to provide a novel method of making metal articles wherein a body containing an amount of metal in excess of that required for the desired article is disposed in a die and an opening or recess is formed in the body by displacing some of the metal thereof from one portion of the body to another while some of the metal of the body is free to flow in at least one direction, and thereafter shaping the body by applying pressure to the body in a die and allowing excess metal of the body to flow into said opening or recess.

Another object of this invention is to provide a novel method of making metal articles wherein a body containing an amount of metal in excess of that required for the finished article is disposed in a die and an opening or recess is formed in the body by forcing a punch thereinto while some of the metal of the body is allowed to flow upwardly along the punch, and thereafter further forming the body to substantially the desired shape by applying pressure thereto in a die and allowing excess metal of the body to flow into said opening or recess.

Still another object of this invention is to provide a novel method of making nut blanks, and the like, which involves the novel steps of placing in a die a body containing an amount of metal slightly in excess of that required for the desired article and forcing a punch into the body of metal to thereby form an opening or recess in the body and to cause the exterior of the body to be shaped in the die while a portion of the metal of the body is allowed to flow upwardly around the punch, and thereafter further forming the exterior of the body to substantially the shape desired in the finished article by applying pressure thereto in a die and allowing the excess metal of the body to flow into said opening or recess.

Yet another object of this invention is to provide a novel method of making nut blanks wherein a substantial portion of the metal of a body of stock is initially displaced into the side walls of the blank thereby forming a central opening while the metal of the body is free to flow in at least one direction, then shaping the exterior of the body to substantially the desired shape in a die by applying pressure to the body and allowing excess metal to be displaced into the central opening of the body and thereafter removing excess metal from said opening to provide a tap opening of the desired size and shape.

It is a further object of this invention to provide a novel method of making metal articles wherein a body of metal is expanded and shaped in a die by forming a recess in the body by displacing metal from one portion of the body to another while some of the metal is free to flow in at least one direction, further forming the body in a substantially closed die while some of the metal is allowed to flow into the recess, and then removing from the body the portion thereof containing the recess.

It is also an object of this invention to provide a novel method for preparing sections of stock for the formation of desired metal bodies wherein a bar of metal is advanced between cooperating swaging dies and between cooperating cutting dies and wherein a section of the bar which was previously acted upon by the swaging dies is cut from the leading end of the bar by the cutting dies during each swaging operation.

Other objects and advantages of this invention will be apparent from the following description when taken in conjunction with the accompanying sheets of drawings, wherein Fig. 1 is an elevational view with parts thereof in section showing a preliminary step of my improved method;

Fig. 2 is a side elevational view of the same apparatus and method step as illustrated in Fig. 1, but showing the dies in closed position;

Fig. 3 is an end view with parts thereof in section showing the entering end of the swaging dies;

Fig. 4 is an elevational view partly in section showing the matrix die and punch, used in the first forming step of my method, with the parts in open relation;

Figs. 5 and 6 are views similar to Fig. 4 but showing the parts in closed relation and with a body of metal being acted upon in the die;

Fig. 7 is an elevational view with parts thereof in section showing, in open relation, the cooperating die and punch used in the second forming step of my method;

Fig. 8 is a view similar to Fig. 7 but showing the parts in closed relation and acting upon a body of metal in the die;

Fig. 9 is a sectional elevational view with parts thereof in section showing, in open relation, the cooperating parts used in performing a completing operation of my method;

Fig. 10 is a similar view but showing the parts in closed relation and acting upon the body of metal in the die;

Fig. 11 is a group of elevational plan and sectional views showing a body of metal from which the desired article, in this instance a nut blank, is to be produced;

Fig. 12 is a similar group of views showing the nut blank after the first forming step has been performed thereon;

Fig. 13 is a similar group of views showing the nut blank after the second forming step has been performed thereon;

Fig. 14 is a similar group of views showing the nut blank after the finishing operation has been performed thereon;

Figure 15:
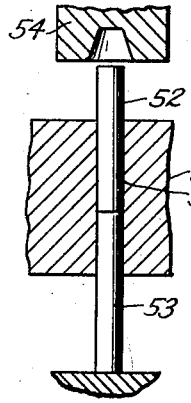
Fig. 15 is an elevational view, with parts in section, illustrating a preliminary step of my method as applied to the production of another article.

Before proceeding with a detailed description of my novel method as illustrated in the accompanying drawings, I wish to point out, in a general way, a difficulty heretofore encountered in the production of nut blanks and other metal articles, and the manner in which the present invention solves this difficulty.

When metal is compressed between two flat anvils, it is well known that a certain load is required to cause permanent deformation and that the load necessary to cause further permanent deformation is nearly proportional to the increase in the cross-sectional area of the part acted upon. A piece of metal being subjected to a test of this kind normally assumes a barrel-shape and this phenomenon is probably accounted for by the friction between the end surfaces of the test piece and the anvils, preventing a free cross-flow of the particles of metal. When such a metal test piece is placed in a matrix or die, this relation of pressure to area continues only until the metal comes into contact with the walls of the matrix, whereupon the pressure ratio rises very abruptly and with no very distinct law. The character of the matrix, condition of its walls, and the molecular formation of the metal being worked, are some of the factors which enter into the problem and affect this pressure ratio.

A simple illustration of what has just been explained may be offered by assuming that a cylinder of steel is placed inside a hexagon matrix such as might be used for forming a hexagon nut blank. When the cylindrical test piece is subjected to pressure, the steel will be deformed by a compression force of approximately 60,000 pounds per square inch being applied thereto until the metal touches the sides of the matrix, whereupon the required pressure suddenly increases and a pressure of about 300,000 pounds per square inch is required to completely change the cross-sectional shape of the test piece to correspond to the hexagonal shape of the matrix. This latter pressure is far in excess of the working pressure desired for steel of the type to be used in making nut blanks and other articles and is also excessive from the standpoint of resulting wear and breakage of the tools and dies being used.

To avoid the need for such excessively high pressures in the formation of nut blanks and other articles, my novel method contemplates forming an opening or recess in the part or body of metal which is to be compressed or pressure shaped within a matrix or die. This recess or opening may also be referred to as a "safety pocket" and, during the further pressure forming of the body of metal in the matrix, the recess or opening accommodates or permits a relatively free displacement of a portion of the metal of the body such that the ultimate pressure required to give the body the desired shape is only about one-half of the corresponding pressure which has been required heretofore.

The application of the novel principle of my improved method to the production of metal articles, such as hexagon nut blanks and the like, will be explained more fully hereinafter but, in general, involves placing a body of stock containing metal slightly in excess of that required for the finished nut blank in a matrix die. A depression or opening is then formed in the body of metal by displacing metal from the central portion of the body into the side walls thereof. This displacement of metal during the forming of the opening or recess causes the body to be shaped or formed in the matrix and, during this forming or shaping operation, some of the metal of the body is allowed to flow relatively freely in at least one direction, preferably upwardly around the punch forming the opening or recess, and this relatively free flow of metal allows the initial forming operation to be performed with a much lower pressure than would be required if the metal of the body were trapped in the die.

The rough shaped blank is then subjected to a further forming step by applying pressure thereto in a substantially closed matrix die and, at the same time, allowing excess metal of the body to flow relatively freely into the opening or recess which was formed during the first forming step. The relatively free flow of metal into the opening or recess of the body permits the second forming step to likewise be carried out at a pressure value considerably less than what has heretofore been required in the forming of nut blanks and other articles.

After the second forming step, the excess metal of the body may be removed therefrom by any other suitable operation, and, in the case where the article is a nut blank, the excess metal may be removed by a shearing operation so as to provide the finished article with a tap opening of the desired size and shape.

For a more detailed description of my novel method of making metal articles, reference will now be had to the accompanying drawings, which show arrangements of apparatus suitable for use in carrying out the method, and which, by way of illustration, show the method as being applied to the production of nut blanks and to the production of cap screws. It will be understood, of course, that various other forms of suitable apparatus may be employed for this purpose, and that the method itself may be applied to the production of various other metal articles.

In Figs. 1 and 2 of the drawings I have illustrated the preliminary step of preparing the sections of stock from which the metal bodies are to be produced by the succeeding forming steps, and I have shown, as apparatus suitable for this purpose, a pair of relatively movable platens 15 and 16 having mounted thereon cooperating swaging dies 17 and 18, and a second pair of platens 15' and 16' having mounted thereon cooperating cutting dies 19 and 20. A bar of stock 21 may be advanced or fed between the cutting and swaging dies by suitable apparatus, not shown, which imparts to the bar a step by step movement such that the leading end of the bar is first passed between and acted upon by the swaging dies and then between the cutting dies.

The bar of metal stock 21 which is being fed between the cooperating swaging and cutting dies is shown, in this instance, as being of substantially round cross-sectional shape. It is not altogether necessary that the bar of stock be of round cross-section, but this shape is usually desirable in carrying out my method, because of the reduced cost of bars of this shape, and also because the working of the metal during the preliminary step improves the character of the metal stock and likewise the quality of the articles produced.

The purpose of the swaging dies 17 and 18 is to roughly shape the leading end of the round bar 21 to correspond more nearly in cross-sectional shape with the articles desired to be produced so as to minimize the amount of cross flow of metal during the subsequent operations. In this instance these dies are shown as being complemental and forming a die of hexagonal shape. As shown in Figs. 1 and 3 of the drawings, the die formed by the cooperating members 17 and 18 is of two parts or sections, namely, a tapering inlet section 22 which initially acts upon the bar 21 to initiate the change in shape from round to hexagon, and a finishing section 23 which completes the change to the rough hexagonal cross-sectional shape desired.

After having been acted upon by the cooperating swaging dies 17 and 18, the leading portion of the bar 21 is advanced with step by step movement between the cooperating cutting dies 19 and 20, and each time that the swaging dies are brought together to the closed position illustrated in Fig. 2 to perform a swaging operation upon the bar 21, the cutting dies 19 and 20 are likewise brought together, or substantially together, to the closed position illustrated in Fig. 2, to thereby sever or cut a predetermined length or section of stock 24 from the bar 21.

In cutting the sections or bodies 24 from the part 21, in the manner just explained, these bodies are cut to such length that each body contains slightly in excess of the amount of metal required to produce one of the finished articles. The roughly shaped body 24 thus produced by the preliminary step is now inserted into a matrix or die 28, which corresponds substantially in shape to the shape desired in the finished article and, as shown in Fig. 4 of the drawings, may be of hexagonal shape when the article to be produced is a hexagon nut blank. The die 28 may be formed in a suitable block of material 29, having a knock-out pin 30 extending thereinto, such that the upper end of the pin forms a part of the bottom of the die cavity.

In carrying out this step of my method a punch 31, which is preferably slightly tapered in form, is forced into the body 24, as indicated in Figs. 5 and 6 of the drawings, so as to displace metal from the central portion of the body into the sides thereof and thus form an opening or recess 32 in the body. Although, in this instance, I show the opening or recess of the body being formed by two successive operations of the punch, it will be understood, of course, that whether the opening is formed by one or more than one operation is relatively unimportant and is to be determined from the character of the article being produced. The punch may be forced into the body 24 for any desired distance, but it is usually desirable that the punch be forced into the body far enough so that, for a purpose presently to be explained, this recess or opening will not be eliminated from the body during the subsequent forming step. It is also desirable that the punch be forced into the body far enough to displace a substantial amount of the metal from the central portion of the body into the sides thereof, so that only a minimum amount of metal will need to be removed by a subsequent operation in the completing of the article.

As the punch 31 is forced into the body 24 and metal is displaced from one portion of the body to another by the punch, the metal is caused to flow in such a way that the body is formed in the die cavity to substantially the desired hexagon shape required in the finished article. As an important feature of my invention, the punch 31 and the die 28 cooperate in such a manner that while the punch is being forced into the body 24, some of the metal of the latter is allowed to flow relatively freely in at least one direction so that the metal is not trapped in the die. Allowing the metal to flow relatively freely in at least one direction in this manner during the forming of the opening or recess in the body, greatly reduces the amount of force required to cause the metal of the body to assume the hexagonal shape of the die cavity. In this instance this relatively free flow of the metal is provided for by the die cavity 28 being open at its upper end, so that as the punch 31 is forced into the body 24 some of the metal of the latter may flow upwardly around the punch. It will be understood, of course, that this relatively free flow of metal may be provided for in other ways.

After the punch 31 has been withdrawn from the body 24, the latter may be ejected from the die recess by the knock-out pin 30. When the body 24 is ejected from the die 28, at the completion of this first forming step, the partially completed nut blank is then of the form illustrated in Fig. 12, that is to say the exterior of the body is of hexagonal shape corresponding substantially with the hexagon exterior of the finished article and also has the central recess or opening 32 extending thereinto. To facilitate the insertion of this partially formed nut blank into the die cavity used in the succeeding forming step, it is usually desirable that the die 28 be slightly smaller in cross-section than the cross-section desired in the finished article.

The partially formed nut blank is next inserted into a die or matrix 34 for the performance of a further forming step thereon. This die may be embodied in a suitable block 35, and in this case is of hexagonal shape corresponding closely with the hexagon shape desired in the finished article. The die is open at the upper end thereof, as shown in Fig. 7, to receive the partially formed nut blank, and also to receive the hexagon punch 36 which cooperates with the die during the second forming step. A suitable knock-out pin 37 may be arranged in the block 35 for ejecting the bodies from the die recess, this pin being arranged so that the upper end thereof forms a portion of the bottom wall of the die recess.

The punch 36 is of a size such that when it is forced into the die recess 34 to subject the body to pressure it substantially closes the upper end of the die cavity, as shown in Fig. 8. It is usually desirable that the punch 36 be provided with an extension 38 of the size and shape corresponding with the size and shape of the tap opening desired in the finished nut blank. The extension 38 may include a tapered section 39, which forms a chamfer around the tap opening when the punch acts upon the body as shown in Fig. 8. The extension 38 may be of any appropriate length, but should in all cases be somewhat shorter than the depth of the recess 32, previously formed in the body, so that this recess will never be completely filled during the second forming step, either by the punch or by the metal being displaced into the recess.

During this second forming step the punch 36 is forced downwardly into the die 34 against the body therein, with the extension 38 entering the recess 32. The pressure of the punch against the body 24 causes the latter to be accurately shaped to conform to the die cavity, and during this operation the excess metal of the body is allowed to flow relatively freely into the recess 32 beneath the extension 38. In allowing this excess metal to flow into the recess the pressure required to complete the forming of the nut blank is considerably less than what would be required, if such a relatively free flow of excess metal were not provided for. In Fig. 8 of the drawings the punch 36 is shown in its closed position, and I have represented, by the reference character 40, the shoulders of excess metal which have been displaced into the recess 32 during this second forming step.

After the punch 36 is withdrawn from the die, the body 24, which is then of the shape illustrated in Fig. 13, may be ejected from the die cavity by means of the knock-out pin 37.

To complete the nut blank from the body 24, which is now of the shape illustrated in Fig. 13, the excess metal is removed from the opening of the body by any suitable means to complete the tap opening. In Figs. 9 and 10 of the drawings I have shown a suitable arrangement of apparatus for this purpose, which includes a centering matrix 41, into which the body 24 may be inserted. A hollow shearing die 42 forms the bottom of the recess in the matrix and cooperates with a punch 43 when the latter is forced downwardly into the recess of the matrix. The downward movement of the punch 43 causes the latter to enter the tap opening, which has been formed by the extension 38 of the punch 36, and further downward movement of the punch 43 causes the metal in the bottom of the previously formed tap opening of the body to be sheared therefrom in the form of a small slug of metal 44, as shown in Fig. 10 of the drawings. A stripper plate 45 may be provided around the punch 43 to facilitate the removal of the punch from the nut blank after the slug 44 has been sheared therefrom. The hollow die 42 is preferably movable in the block 41, so that after the shearing operation has been performed by the punch 43 the upward movement of this hollow die will eject the finished nut blank from the matrix.

After the operation illustrated in Figs. 9 and 10 has been performed upon the body 24, the shape of the body is substantially that which is illustrated in Fig. 14, and which in this instance is a hexagon nut blank.

As already indicated, my novel method is especially suited to the production of hollow metal articles and in Figs. 15 to 23, inclusive, I have shown my method applied to the production of screw blanks, such as blanks for socket-head cap screws. In the production of these articles the forming steps of my method are carried out in substantially the same manner as already described in connection with the production of nut blanks.

Figure 16:
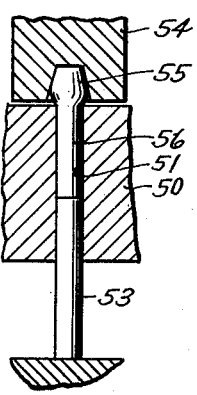
Fig. 16 is an elevational view, with parts in section, similar to Fig. 15 but with the cooperating members in closed relation and showing the change produced in the article by the preliminary step.
Figure 17:
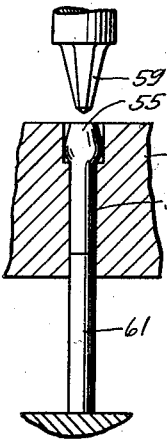
Fig. 17 is an elevational view, with parts in section, illustrating, in open relation, the cooperating members used in applying the first forming step of my method to the production of such other article.

Although various forms of apparatus may be used in applying my novel method to the production of screw blanks in the drawings I have illustrated a simple arrangement of such apparatus which, as shown in Figs. 15 and 16, includes apparatus for performing a preliminary step, namely, that of upsetting a section of stock to provide the same with a head portion. This apparatus includes a die block 50 having a recess 51 which receives a section of stock 52 from which the screw blank is to be formed. A knock-out pin 53 may be arranged to extend into the die block to form the bottom wall of the recess 51 and to position the section of stock in the die block with an end of the section projecting above the block as shown in Fig. 15. A movable die member or punch 54 is arranged for reciprocation relative to the die block 50 and, when brought into cooperating relation with the die block, acts upon the projecting portion or section of stock and upsets the same, as shown in Fig. 16, to provide the section of stock with the enlarged head forming portion 55. After this preliminary step has been carried out the screw blank 56 may be ejected from the die block 50 by the knock-out pin 53.

The screw blank 56 is then inserted into the die cavity 57 of a suitable die block 58 in such position that the head portion 55 may be acted upon by a punch 59 which is arranged for movement relative to the die block. The die cavity 57 is preferably formed with an enlargement at the upper end thereof which receives the head portion 55 and this enlargement may be of hexagon or other cross-sectional shape corresponding approximately with the cross-sectional shape which the head of the screw is to have in the finished article.

The punch 59 is preferably tapered, as in the case of the punch 31 shown in Figs. 4, 5 and 6, and if the head of the finished screw is to have a wrench-socket therein the punch is preferably provided with a hexagon or other polygonal arrangement of side faces. In carrying out this forming step of my method, the punch 59 is forced into the head portion 55 to form an opening or recess 60 therein. In forming this recess metal is displaced by the punch from the center of the head portion into the side walls thereof and the head portion is thereby expanded in the die recess 57 so that it assumes the hexagon or other cross-sectional shape of the die recess.

Figure 18:
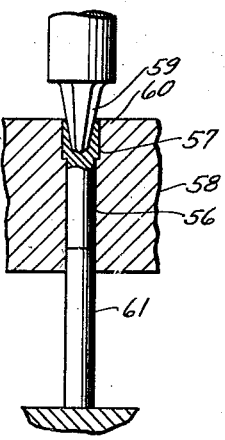
Fig. 18 is an elevational view, with parts in section, showing the cooperating members of Fig. 17 in their closed relation.

It will be noted from Fig. 18 of the drawings that while the punch 59 is being forced into the head portion 55 and metal is being displaced from one part of this portion to another, as explained above, the die recess is open at the top thereof so that metal may flow upwardly along the punch. In other words, during this forming step of my method, the metal of the head portion 55 is allowed to flow relatively freely in at least one direction and, as already explained, this eliminates the need for the extremely high forming pressures which would otherwise be required if the metal were trapped in the die recess. After this forming step has been completed the partially formed screw blank may be ejected from the die block 58 by means of the knock-out pin 61.

Figures 19, 20:
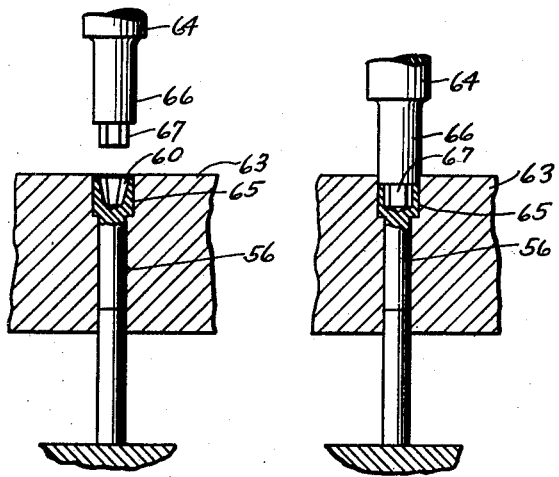
Fig. 19 is an elevational view, with parts in section, illustrating, in open relation, the cooperating members used in carrying out the second forming step of my method when applied to the production of such other article.
Fig. 20 is a similar view but showing the cooperating members in closed relation.

In Figs. 19 and 20, I show apparatus for carrying out the second forming step of my method, as applied to the screw blank 56, and this apparatus may include a die block 63 and a punch 64 for cooperation therewith. The die block is provided with a recess 65 similar to the recess of the die block 58 but having proportions corresponding closely with the proportions desired in the finished screw blank. To facilitate the insertion of the partially formed screw blank 56 into the die recess 65, it is usually desirable that the latter recess be slightly larger than the recess 57 of the die block 58.

The punch 64 is constructed with a stem portion 66 of substantially the same cross-sectional shape and size as the die recess 65 and with an extension 67 of cross-sectional shape corresponding with the shape which it is desired for the recess 60 in the finished screw blank. In carrying out the second forming step, the punch 64 is moved downwardly to cause the projection 67 to enter the recess 60 of the screw blank and also to cause the stem portion 66 to enter the upper end of the die recess. During this operation the stem portion 66 closes the die opening so that the screw blank is substantially trapped in the die cavity and as the downward movement of the punch subjects the metal of the blank to pressure, the metal is caused to flow so that the exterior of the head portion is shaped to the hexagon, or other form of the die recess, and the recess 60 is likewise shaped to correspond with the cross-sectional shape of the punch projection 64.

The extension 67 is of a length to extend into the recess 60 for an appropriate distance but in no case is this extension long enough to engage the bottom of the recess and, during the forming step, excess metal contained in the blank is allowed to flow into the recess 60 beneath the punch extension. Since the recess of the blank is not entirely filled up during this operation it will be seen that when the metal is subjected to pressure it can flow relatively freely into the recess and the forming pressure is considerably less than what would be required if the metal were trapped in, and completely filled, the die.

Figure 22:
Fig. 22 is a top plan view thereof.
Figure 23:
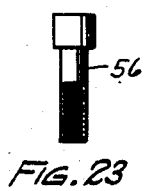
Fig. 23 is a side view showing a screw completed from the screw blank of Fig. 21.
Figure 21:
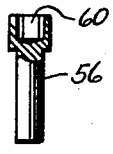
Fig. 21 is an elevational view with parts broken away showing, as such other article, a screw blank produced by my method.

In Figs. 21 and 22 I have shown the blank for a socket-head cap screw as produced by my method and in Fig. 23 I have shown the socket head cap screw in its completed form.

Figure 24:
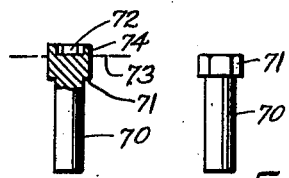
Fig. 24 is a side elevational view showing a partially completed screw blank produced by the forming steps of my method and illustrating a further step in the completing of the screw blank.
Figure 25:
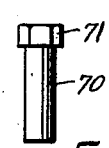
Fig. 25 is a side view showing the screw blank completed from the partially formed blank of Fig. 24.

While my novel method is especially suited to the production of hollow metal articles such as the nut blank and the socket head cap screw mentioned above, the invention is not necessarily limited, however, to the production of articles which, in their finished form, contain an opening or recess, but can be used in the production of metal bodies of substantially solid form. By way of example, I have illustrated in Figs. 24 and 25, this further feature of the invention as applied to the production of a solid screw blank for a bolt or cap screw of conventional form. Fig. 24 shows a screw blank 70 which is somewhat similar to the screw blank shown in Fig. 21 and which may be produced by substantially the same method steps and operations which have already been described in detail for the production of the screw blank of Fig. 21. The screw blank 70 is shown as having a head portion 71 of hexagon or other desired cross section and with a recess 72 in the end thereof corresponding with the recess 60 of the screw blank of Fig. 21.

According to this further feature of the invention, the screw blank 70 is constructed by substantially the same steps and operation as are used for the screw blank 21 with the exception that the recess 72 is preferably shallower than the recess 60. To complete the screw blank the upper portion of the head 71 is cut off, by any suitable means, on a plane corresponding approximately with the line 73 so that the recess 72 will be included in the portion or section 74 which is cut out from the head of the screw blank. It will be understood, of course, that the recess 72 may be formed to any desired depth, depending upon manufacturing requirements and upon the depth or thickness of head required in the finished blank. When the upper portion of the head of the screw blank has been cut off it will be seen from Fig. 25 that the resulting screw blank is a solid metal body.

From the foregoing description and the accompanying drawings it will now be readily understood that I have provided a novel method for the economical production of metal articles, such as nut blanks, screw blanks, and other articles, which are of superior quality. It will be understood moreover that according to the principle of my invention my novel method makes possible the economical production of these articles with working pressures much below the working pressures heretofore required for the production of these articles, with the result that tool wear and breakage is reduced to a minimum and, likewise, the costly interruptions to continuous production operations, incident to the breakage and replacement of tool and die parts, are largely eliminated. These important advantages of my novel method have been realized, as will now be understood, by permitting of a relatively free flow of a portion of the metal of the body in at least one direction during the first forming step and by permitting of a relatively free flow of a portion of the metal of the body into a previously formed recess or opening of the body during the second forming step. This relatively free flow of metal during the forming steps prevents the metal of the body from being completely trapped in the die cavity, and avoids the extremely high pressures and frequent tool breakage which would otherwise result because of the incompressible characteristic of the metal.

While I have illustrated the novel method of my invention in a detailed manner, and have disclosed the same as being used in the production of nut blanks and as being carried out by one form of apparatus, it will be understood, of course, that this method may be used for the production of various other metal articles, and that the method can be carried out by the use of various forms of apparatus other than that herein illustrated.

Having thus described my invention, what I claim is:

1. The method of making metal articles which comprises inserting into a matrix die a body containing approximately the amount of metal required for the article to be produced, forcing a tapered tool into said body and thereby forming a tapered opening therein while the metal of the body is allowed to flow in at least one direction, forcing a straight punch part-way into the tapered opening and in the same operation pressure shaping the body in a die while metal of the body is allowed to flow into said opening, and then completing the article by removing excess metal from the body.

2. The method of making metal articles which comprises forming a recess in a body of metal by displacing metal from one portion of the body to another and at the same time shaping the exterior of the body while some of the metal is free to flow in at least one direction, and then further shaping the body in a die by inserting a punch part-way into said recess and applying pressure to the body while excess metal thereof is allowed to flow into the recess beneath said punch, and then removing excess metal from the body.

3. The method of making metal articles which comprises forming a recess in a body of metal by displacing metal from one portion of the body to another and at the same time shaping the exterior of the body while some of the metal is free to flow in at least one direction, and then further shaping the body in a substantially closed die by inserting a punch part-way into said recess and applying pressure to the body while excess metal thereof is allowed to flow into the recess beneath said punch, and then removing excess metal from the body.

4. The method of making metal articles which comprises forcing a punch into a body of metal and thereby forming a recess in the body by causing metal to be displaced from one portion of the body to another, shaping the exterior of the body by applying pressure thereto in a substantially closed die while a punch extends part-way into said recess so that excess metal is displaced into said recess beneath the punch, and then removing excess metal from the recess to provide the body with an opening of desired size and shape.

5. The method of making hollow articles which comprises forcing a punch into a body of metal and thereby forming a recess in the body by causing metal to be displaced from one portion of the body to another, shaping the exterior of the body by applying pressure thereto while a punch extends part-way into said recess so that excess metal is displaced into said recess beneath the punch, and then removing excess metal from the recess to provide the body with an opening of desired size and shape.

6. The method of making hollow relatively thick-walled articles which comprises forming an opening in a solid body containing metal in excess of that required to produce the desired article by displacing metal from the central portion into the wall portion of the body while the metal of the body is allowed to flow in at least one direction, forming the exterior of the body to a desired shape by applying pressure thereto in a die having a member extending part-way into said opening while excess metal of the body is allowed to flow into said opening beneath said extending member, and thereafter removing metal from said opening to complete the same to the desired size and shape.

7. The method of making nut blanks which comprises forming a recess in a body of metal by expanding the same in a polygonal die cavity of fixed cross section and thereby imparting a corresponding polygonal shape to the exterior of the body while metal of the body is free to flow axially of the die cavity, further shaping the exterior of the body to substantially the desired nut shape by applying pressure thereto in a die cavity of fixed polygonal cross section by a punch of corresponding polygonal cross section while a reduced axial projection of the punch extends part way into said recess and allowing excess metal of the body to be displaced into said recess beneath said axial projection, and then removing excess metal from the recess to provide the nut blank with a tap opening.

8. The method of making nut blanks which comprises forming a recess in a body of metal by displacing metal from the central portion of the body into the side walls thereof while the metal of the body is free to flow in at least one direction, further forming the body in a die to substantially the desired nut shape by inserting a punch part-way into said recess and applying pressure to the body while some of the metal thereof is allowed to flow into said recess beneath said punch, and thereafter removing excess metal from said recess to form a tap opening.

9. The method of making nut blanks which comprises forcing a punch into a body of metal to form an opening therein and allowing some of the metal of the body to flow upwardly along the punch, forming the exterior of the body to substantially the desired nut shape by applying pressure thereto in a die while a punch extends part-way into the opening of said body and allowing some of the metal of the body to flow into said opening beneath the punch, and thereafter removing excess metal from said opening to form a tap opening of the desired size and shape.

10. The method of making nut blanks which comprises forcing a punch into a body of metal disposed in a matrix die and thereby forming a recess in the body and at the same time expanding and shaping the body to nut form in the die while some of the metal of the body is allowed to flow upwardly along the punch, further forming the exterior of the body to substantially the desired nut size by applying pressure thereto in a die cavity of fixed cross section by a punch of corresponding cross section while a reduced axial projection of the punch extends part way into said recess and allowing some of the metal of the body to flow into said recess beneath the axial projection, and thereafter removing excess metal from said recess to form a tap opening of the desired size and shape.

11. The method of making nut blanks which comprises cutting from a bar of stock a body or section containing an amount of metal slightly in excess of that required to produce a desired nut blank, forcing a punch into said body while the latter is disposed in a die cavity of fixed cross section and having approximately the shape of the desired nut blank and thereby forming a recess in the body and expanding and shaping the same to nut form in the die and at the same time allowing some of the metal of the body to flow upwardly along the punch, further shaping the exterior of the body in a die of fixed cross section by applying endwise pressure thereto by a punch of corresponding cross section while a reduced axial projection of the punch extends part way into said recess and allowing excess metal of the body to be displaced into said recess beneath said reduced projection of the punch, and thereafter removing the excess metal from the recess to provide a tap opening.

12. In a method of making headed articles the steps of upsetting a portion of a body of stock, forming a recess in the upset portion by expanding the same laterally in a die of fixed cross section and at the same time shaping the upset portion while some of the metal thereof is free to flow in at least one direction, and then further shaping the upset portion into a head by applying pressure thereto in a die cavity of fixed cross section by a punch of corresponding cross section while a reduced axial projection of the punch extends part way into said recess and allowing some of the metal of the upset portion to be displaced into the recess beneath said reduced projection.

13. In a method of making headed articles the steps of upsetting a portion of a body of stock, forming a recess in the upset portion by displacing metal from one part of such upset portion to another and at the same time shaping the upset portion while some of the metal thereof is free to flow in at least one direction, further shaping the upset portion into a head by inserting a punch part-way into said recess and applying pressure to the upset portion in a die while some of the metal is allowed to flow into the recess beneath the punch.

14. The method of making metal articles of desired shape which comprises forming a recess in a body of metal disposed in a die by displacing metal from one portion of the body to another and thereby expanding and shaping the body in the die while the metal of the body is free to flow in at least one direction, further forming the body in a die to substantially the desired shape by applying pressure to the body and allowing some of the metal thereof to flow into the recess, and then removing from the body the portion thereof containing the recess.

15. The method of making headed articles which comprises upsetting a portion of a body of stock, forming a recess in the upset portion by displacing metal from one part of such upset portion to another and thereby expanding and shaping the upset portion in a die while the metal thereof is free to flow in at least one direction, further shaping the upset portion into a head by applying pressure thereto in a die and allowing some of the metal to flow into the recess, and then removing from the head the portion thereof containing the recess.

16. The method of making hollow metal articles which comprises forcing a tapered punch into a metal body and thereby expanding and shaping the same in a die cavity, and then forcing a straight punch into the recess of the body and in the same operation subjecting the body to pressure in a die cavity.

17. The method of making hollow metal articles which comprises forcing a tapered punch into a metal body and thereby expanding and shaping the same in a die cavity, and then forcing a straight punch part-way into the recess of the body and subjecting the body to pressure in a die cavity, to thereby shape the exterior of the body and cause metal to flow into the recess around and beneath the punch.

18. The method of making hollow metal articles which comprises forcing a tapered punch into a metal body and thereby expanding and shaping the same in a die cavity while metal of the body is free to flow in the direction of the axis of the punch, and then inserting a straight punch in the recess of the body and subjecting the body to pressure in a die cavity to cause the recess to be shaped to the punch and the exterior of the body to be shaped by the die cavity.

19. The method of making hollow metal articles which comprises forcing a punch of tapering polygonal cross section into a metal body and thereby expanding and shaping the same in a die cavity while metal of the body is free to flow in the direction of the axis of the punch, and then inserting a straight punch of polygonal cross section into the recess of the body and subjecting the body to pressure in a die cavity to cause the recess to be shaped to the punch and the exterior of the body to be shaped by the die cavity.

LEE A. FRAYER.